United States Patent [19]

Inagaki et al.

[11] 4,146,893
[45] Mar. 27, 1979

[54] SYSTEM FOR COMPENSATING FOR CROSS POLARIZATION COUPLING

[75] Inventors: Kazunori Inagaki; Yasuo Hirata, both of Tokyo; Akira Ogawa, Machida, all of Japan

[73] Assignee: Kokusai Denshin Denwa Kabushiki Kaisha, Japan

[21] Appl. No.: 851,810

[22] Filed: Nov. 15, 1977

[30] Foreign Application Priority Data

Nov. 18, 1976 [JP] Japan .................................. 51-137788

[51] Int. Cl.$^2$ ............................................. H01Q 21/24
[52] U.S. Cl. .................................. 343/100 PE; 325/65; 343/100 ST
[58] Field of Search .................... 343/100 PE; 325/65, 325/100 ST

[56] References Cited

U.S. PATENT DOCUMENTS

| 3,500,207 | 3/1970 | Ruthroff | 325/65 X |
| 3,735,266 | 5/1973 | Amitay | 343/100 PE X |
| 3,986,123 | 10/1976 | Tirro et al. | 325/56 |

Primary Examiner—Maynard R. Wilbur
Assistant Examiner—Richard E. Berger
Attorney, Agent, or Firm—Robert E. Burns; Emmanuel J. Lobato; Bruce L. Adams

[57] ABSTRACT

A system for compensating for cross polarization coupling in a dual-polarization satellite communication system, in which two polarized waves of the same frequency and orthogonal to each other are alternately transmitted as a pilot wave from an earth station at a predetermined period. The same polarized wave components of the two signals received by a communication satellite are sent back to the earth station, so that the sent back signal is received by the earth station. An amplitude ratio and a phase difference between the same polarized wave components of the two signals of the received pilot signal are detected. A communication signal wave to be transmitted from the earth station is formed as an elliptically polarized wave by the use of the detected information, thereby compensating for cross polarization coupling of the communication signal wave caused during propagation between the earth station and the communication satellite.

4 Claims, 5 Drawing Figures

SYSTEM FOR COMPENSATING FOR CROSS POLARIZATION COUPLING

BACKGROUND OF THE INVENTION

1. Field of the Invention

This invention relates to a system for compensating for cross polarization coupling which is needed for the reuse of a frequency wave by orthogonal polarization in a satellite communication system.

2. Description of the Prior Art

Generally, the reuse of a frequency wave by the employment of two polarized waves having the same frequency but polarized orthogonal to each other will enable the traffic capacity to be increased substantially twice or so. In practice, however, polarization distortion by the rainfall and incomplete polarization characteristics of an earth station antenna and a satellite antenna offer a serious obstacle to the realization of a dual-polarization satellite communication system. Especially, the orthogonality is seriously degraded by the rainfall and the amount of its influence differs with time, regions, frequency bands used, etc. Consequently, an important key for the realization of the dual-polarization satellite communication system is how to compensate for cross polarization coupling caused by the rainfall.

By the way, a main cause of cross polarization coupling by the rainfall in frequency bands (for example, 6 GHz and 4 GHz bands) assigned to satellite communications is as follows: That is, a raindrop is not completely spherical but elliptic, so that the propagation delay for an electric wave is maximum or minimum in the major axis M or the minor axis L of the ellipse, respectively. This results in the polarization dependency of the delay. In this case, an angle between the direction of the equivalent major axis M of the raindrop and the horizon is called an effective canting angle (hereinafter referred to as ECA), while a difference between the maximum delay and the minimum delay is called a differential phase shift (hereinafter referred to as DPS).

For compensating for cross polarization coupling, it is necessary to detect ECA and DPS in both of an up-link (a path from the earth to a satellite) and a down-link (a path from the satellite to the earth) during rainfall. It is known in the art that if ECA and DPS can be detected, compensation for cross polarization coupling in the both links can be achieved by inserting in a transmitter or a receiver a dielectric plate having a delay equal to a detected DPS.

It is also known that the compensation for cross polarization coupling in the down link can be effected if the earth station receives a beacon wave from a satellite and detects the level and phase of the received wave for DPS and ECA, respectively.

For compensating for cross polarization polarization in the uplink, it is necessary for the station effecting the compensation to send a pilot signal and receive the same through the satellite. Heretofore, there has been proposed a method of sending two pilot waves of different frequencies in an orthogonal relationship to each other for the detection of ECA and DPS. By this method, the detection of DPS can be achieved by comparing the received levels of the two pilot waves sent back from the satellite with each other but the two pilot waves are needed therefor, and since information of a phase difference between the two pilot waves cannot be utilized because of a frequency difference there between, ECA in the up-link cannot be directly detected.

SUMMARY OF THE INVENTION

Accordingly, an object of this invention is to provide a system for compensating for cross polarization coupling in the up-link wave of a dual-polarization satellite communication system by the use of a pilot wave of one frequency.

To attain the above object and other objects of the present invention, the detection of ECA and DPS in the up-link is achieved by the transmission and reception of a pilot wave of one frequency to thereby enable compensation for cross polarization coupling for a communication signal in the up-link. The compensation in the down link is also possible, of course, with the conventional system if the abovesaid pilot wave is utilized. Further, in accordance with this invention, even in case of a communication system using either a linearly polarized wave or a circularly polarized wave, the compensation for cross polarization coupling is possible and, at the same time, the compensation for cross polarization can be effected by the transmission and reception of the pilot wave through a dual-polarization satellite communication circuit or a one-polarization satellite communication circuit.

BRIEF DESCRIPTION OF THE DRAWINGS

The principle, construction and operation of this invention will be clearly understood from the following detailed description taken in conjunction with the accompanying drawings, in which.

DESCRIPTION OF THE PREFERRED EMBODIMENTS

This invention will hereinafter be described in connection with a case where a communication system is established by circularly polarized waves and the detection of DPS and ECA for the compensation for cross polarization coupling is performed by the transmission and reception of a pilot wave through a one-polarization satellite communication circuit.

Figure 1:
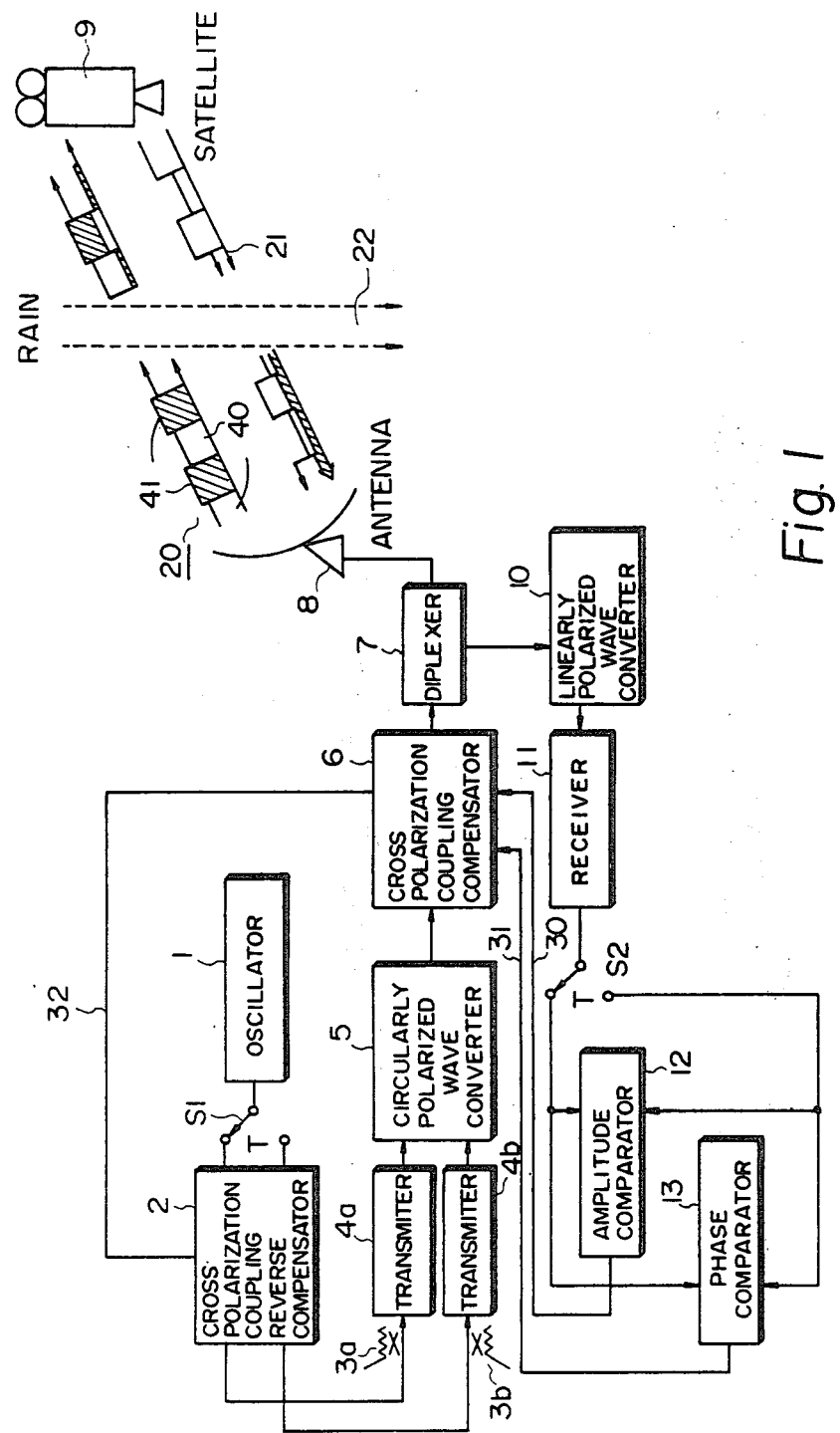
FIG. 1 is a block diagram illustrating an embodiment of this invention.

FIG. 1 illustrates an embodiment of this invention. In FIG. 1, reference numeral 1 indicates an oscillator for generating a signal wave having a frequency different from that of a communication signal to be transmitted; 2 designates a cross polarization coupling reverse compensator; 3a and 3b identify hybrid circuits; 4a and 4b denote transmitters; 5 represents a circularly polarized wave converter of a transmitting side; 6 shows a cross polarization coupling compensator; 7 refers to a diplexer; 8 indicates a transmitting and receiving antenna; 9 designates a communication satellite; 10 identifies a linearly polarized wave converter of a receiving side; 11 denotes a receiver; 12 represents an amplitude comparator; 13 shows a phase comparator; 20 refers to a signal of the up-link which is established from the earth station antenna 8 to the communication satellite 9; and 21 indicates a signal of the down-link, white parts 40 indicating clockwise polarized waves and black parts 41 counter clockwise polarized waves. Reference numeral 22 designates a rainfall region; 30 identifies a signal for setting the amount of phase compensation; 31 denotes a signal for setting the direction of a dielectric plate for compensation; and 32 represents a reverse compensation setting signal.

Figure 2:
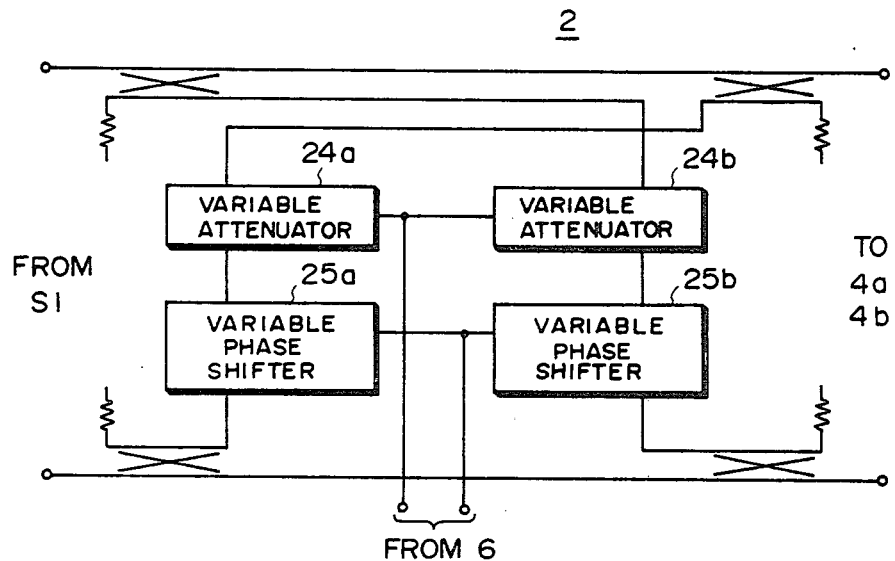
FIG. 2 is a block diagram illustrating an example of a cross polarization reverse compensator used in the embodiment shown in FIG. 1.

The output from the oscillator 1 is switched by a switch S1 for each predetermined period T to supply the output of the oscillator as an input for the clockwise polarized wave and as an input for the counter clockwise polarized wave to the cross polarization reverse compensator 2. The reverse compensator 2 is a circuit inserted for sending out a pilot signal in the form of a complete circularly polarized wave at all times. This circuit 2 is composed of, for example, variable attenuators 24a, 24b and variable phase shifters 25a, 25b as shown in FIG. 2, and has a function of cancelling the compensation effect of the cross polarization compensator 6 described later on. The output of the reverse compensator 2 is combined by the hybrid circuits 3a and 3b with communication message signals and is applied to the transmitters 4a and 4b. The outputs of the transmitters 4a and 4b are converted by the circularly polarized wave converter 5 to a clockwise polarized wave and a counter clockwise polarized wave, respectively, which are fed to the compensator 6. Consequently, compensation for cross compensation coupling in the up-link is achieved for the communication message signals and then the polarized waves are transmitted from the antenna 8. Since the aforesaid reverse compensation is effected for a pilot signal included in the antenna output, a complete clockwise polarized wave 40 and a complete counter clockwise polarized wave 41 are alternately sent out from the antenna at a period T. When the pilot signal passes through the rainfall region 22, counter clockwise polarized wave components and clockwise polarized wave components are newly derived from the clockwise polarized wave 40 and the counter clockwise polarized wave 41, respectively, but only the clockwise polarized wave components are received by the satellite 9 and sent back therefrom as a clockwise polarized wave. When the clockwise polarized wave returned from the satellite 9 passes through the rainfall region 22 again, counter clockwise polarized wave components are generated. However, the clockwise polarized wave components and the counter clockwise polarized wave components are separated by the linearly polarized wave converter 10 from each other and only the former is applied to the receiver 11. The output of the receiver 11 is separated by a switch S2 into the clockwise polarized wave components received in response to the transmission of the clockwise polarized wave from the transmitter side and the clockwise polarized wave components received in response to the transmission of the counter clockwise polarized wave. The amplitude and phase comparison operations between both of these components are carried out by the comparators 12 and 13, respectively. The compared results obtained from the comparators 12 and 13 are respectively applied as the signals 30 and 31 to the phase compensator 6.

Figure 3:
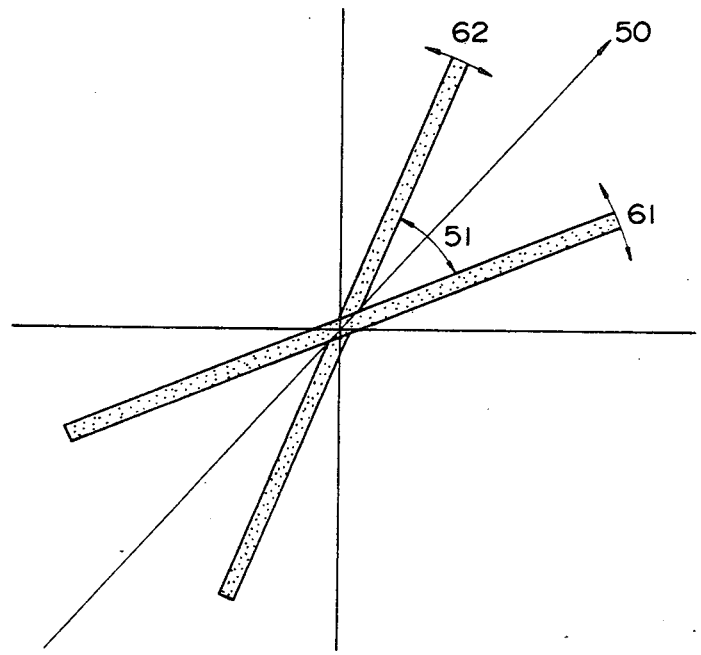
FIG. 3 is a diagram explanatory of the construction and operation of a cross polarization compensator used in the embodiment shown in FIG. 1.

FIG. 3 illustrates an internal structure principle of the cross polarization compensator 6 shown in FIG. 1. In FIG. 3, reference numerals 61 and 62 indicate rotatable dielectric plates; 51 designates an angle between the two dielectric plates; and 50 identifies the direction of a bisector of the angle 51. The magnitude of DPS which such a compensator as shown has is determined by the angle 51, while the direction of DPS is given by the direction 50 of the bisector. The abovesaid signal 30 includes information on the magnitude of DPS of the rainfall region in the up-link to control the angle 51 in the cross polarization compensator 6 of the transmitter side shown in FIG. 3. On the other hand, the signal 31 includes information on the direction of DPS of the rainfall region in the up-link to control the direction 50 in the compensator 6 of the transmitter side. As a result of controlling the dielectric plates by such signals 30 and 31, the communication signal is controlled to be transmitted as an elliptically polarized wave after the cross polarization components by the rainfall region are previously compensated by the compensator 6, so that the communication signal becomes a complete circularly polarized wave immediately before reaching the receiving antenna of the satellite 9. For the pilot signal to be transmitted, a reverse compensation is effected by the signal 32 in the cross polarization coupling reverse compensator 2 for cancelling the compensation effect of the cross polarization compensator 6, so that the pilot signal becomes a complete circularly polarized wave immediately after being transmitted from the antenna 8.

Figure 4:
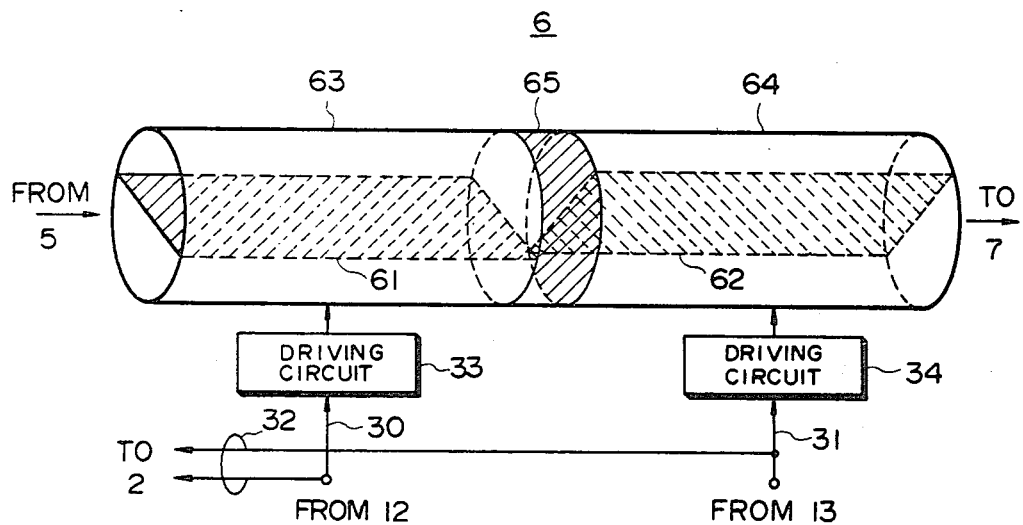
FIG. 4 is a block diagram illustrating an example of a cross polarization compensator used in the embodiment shown in FIG. 1.

With reference to FIG. 4, an example of the cross polarization compensator 6 will be more fully described below. In FIG. 4, dielectric plates 61, 62 are respectively seated in waveguides 63, 64, which are connected through a rotary joint 65 so as to be independently rotatable on the same axis. The control signals 30, 31 respectively applied from the amplitude comparator 12 and the phase comparator 13 rotate, through driving circuit 33, 34, the waveguides 63, 64 respectively by appropriate values, so that the signal from the circularly polarized wave converter 5 is previously compensated for the above-mentioned cross polarization coupling. The control signals 30, 31 are employed as the above-mentioned control signal 32.

Figure 5:
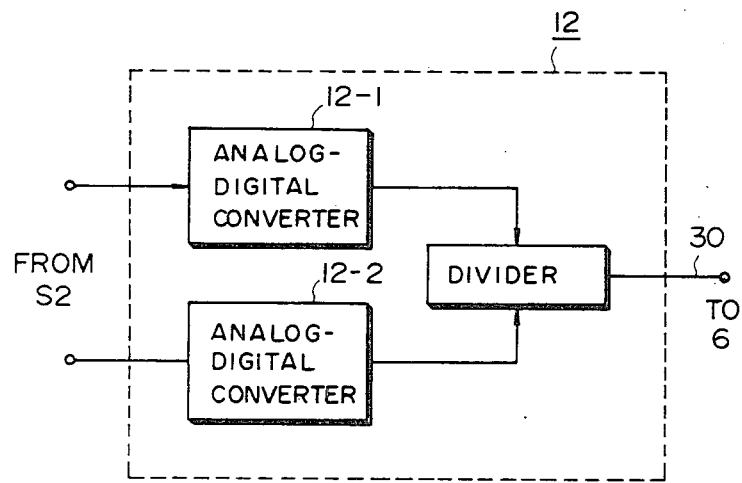
FIG. 5 is a block diagram illustrating an example of an amplitude comparator used in the embodiment shown in FIG. 1.

An example of the amplitude comparator 12 comprises, as shown in FIG. 5, analog-digital converters 12-1, 12-2 and a divider 12-3. The analog-digital converters 12-1, 12-2 convert two analog inputs from the switch S2 to two digital pulses, which are processed in the divider 12-3 to obtain the signal 30 representative of a ratio of the levels of the two analog inputs.

The above is an embodiment of this invention. A description will hereinafter be given of the relationships between outputs of the amplitude comparator 12 and the phase comparator 13 and between the direction and delay of the dielectric plates inserted.

For the compensation for cross polarization coupling in the up-link in accordance with the system described above with reference to FIG. 1, it is necessary to retain the amplitude and phase relations between the both polarized wave components of the transmitted pilot signal constant at all times. For example, if the amplitudes of the clockwise polarized wave and the counter clockwise polarized wave are taken as $A_R$ and $A_L$, respectively, in terms of the amplitude relation and if the output of the oscillator 1 is applied as the input signal to the cross polarization reverse compensator 2 in FIG. 1 in terms of the phase relation, an elliptically polarized wave is generally radiated from the antenna 8. Let it be assumed that the major axis of the elliptically polarized wave is set to be perpendicular to the horizon. In such an instance, if the clockwise polarized wave and the counter clockwise polarized wave are alternately transmitted, and if clockwise polarized wave components $B_R$ received in response to the transmission of the clockwise polarized wave and counter clockwise polarized wave components $B_L$ received in response to the transmission of the counter clockwise polarized wave are compared by the comparator 12 in amplitude with each other, the magnitude $\Delta\phi$ of the phase delay of the dielectric plate to be compensated for by the comparator 6 is given by the following equation (1).

$$\Delta\phi = 2 \cot^{-1}\left(\frac{\text{amplitude of } B_R \times A_L}{\text{amplitude of } B_L \times A_R}\right) \quad (1)$$

On the other hand, the direction $\psi$ (an angle in which the direction of rotation of the clockwise polarized wave from the earth to the satellite is assumed as positive with respect to the horizon), in which the dielectric plate for compensation is inserted, is given by the following equation (2).

$$\psi = \frac{(\text{phase of } B_L - \text{phase of } B_R)}{2} + \frac{\pi}{2} \quad (2)$$

The magnitude $\Delta\phi$ of the equation (1) is equal to DPS of the rainfall region in the up-link and the direction $\psi$ of the equation (2) is at right angles to ECA of the rainfall region. If the compensation operation in the circuit 6 is achieved by the dielectric plates having the phase difference given by the equations (1) and (2), the communication signal wave transmitted from the antenna 8 as an elliptically polarized wave becomes a complete circularly polarized wave immediately before arriving at the receiving antenna of the satellite 9.

In a case where the output of the oscillator 1 is applied as two input signals to the cross polarization reverse compensator 2, if the major axis of the elliptically polarized wave output from the antenna 8 is not set to be vertical relative to the horizon, the direction $\psi$ given by the equation (2) is given as an angle from the direction perpendicular to the direction of the major axis.

As described above, even in a case where the satellite is capable of transmitting and receiving only the clockwise polarized wave, if the present invention is employed, the compensation for cross polarization coupling in the up-link can be easily achieved using a pilot signal wave by adding a relatively simple circuit to the transmitter side and the receiver side. Further, if the abovesaid pilot signal is used, compensation in the down-link can be also effected as in the conventional system. Accordingly, this invention is of great utility when employed in the satellite communication system utilizing the orthogonal polarization.

Since the clockwise polarized wave components which are produced on the satellite by the counter clockwise polarized wave components 41 transmitted from the earth station antenna 8, are usually low in level, if the clockwise polarized wave components are affected by noise or the like to introduce difficulty in measurement and in compensation, it is possible to avoid such difficulty by transmitting the counter clockwise polarized wave components at a level higher than the clockwise polarized wave components, as shown in FIG. 1. Further, the clockwise polarized wave and the counter clockwise polarized one may be also switched by the switch S1 at different periods. Moreover, it is evident that this invention is also applicable to the case of using an orthogonal polarization circuit and that a linearly polarized pilot wave may be also employed in place of the circularly polarized wave. Further, the pilot wave sent back to the earth station from the satellite need not always be one polarized wave component, but both a clockwise polarized wave component and a counter clockwise polarized component may be sent back and, in such a case, it is desirable that they have different frequencies.

What we claim is:

1. A system for compensating for cross polarization coupling in a dual-polarization satellite communication system, comprising:
    terminal means for receiving communication signals;
    pilot means for generating a pilot wave by alternately switching at a predetermined period two polarized waves of the same frequency and orthogonal to each other, the frequency of said pilot wave being different from said communication signals;
    hybrid means operatively coupled to said pilot means and said terminal means for combining said pilot wave with said communication signals to provide a combined wave inclusive of said pilot wave of two polarized waves and said communication signals of two polarized waves;
    transmitter means operatively coupled to said hybrid means for transmitting said combined wave to a communication satellite in the dual-polarization satellite communication system;
    receiver means for receiving said pilot wave sent back from said communication satellite;
    detection means connected to said receiver means for detecting an amplitude ratio and a phase difference between said two polarized waves of said pilot wave received by said receiver means; and
    first compensation means operatively coupled to said transmitter means and said detection means for elliptically polarizing said two polarized waves of said communication signals according to the amplitude ratio and the phase difference detected by said detection means so that said elliptically polarized waves assume circularly polarized waves immediately before arriving at said communication satellite.

2. A system according to claim 1, further comprising:
    second compensation means operatively coupled to said pilot means and said detection means for reversely polarizing said two polarized waves of said pilot wave according to the amplitude ratio and the phase difference detected by said detection means so that circularly polarized waves of said pilot wave are transmitted from said transmitter means.

3. A system according to claim 1, in which said transmitter means includes means for making levels of two polarized waves of said pilot wave different at the output side thereof.

4. A system according to claim 1, in which said receiver means includes a linearly polarized wave converter.

* * * * *